Dec. 8, 1936.    W. B. HODGE    2,063,874
TRAVELING CLEANER
Filed Jan. 17, 1936    2 Sheets-Sheet 1
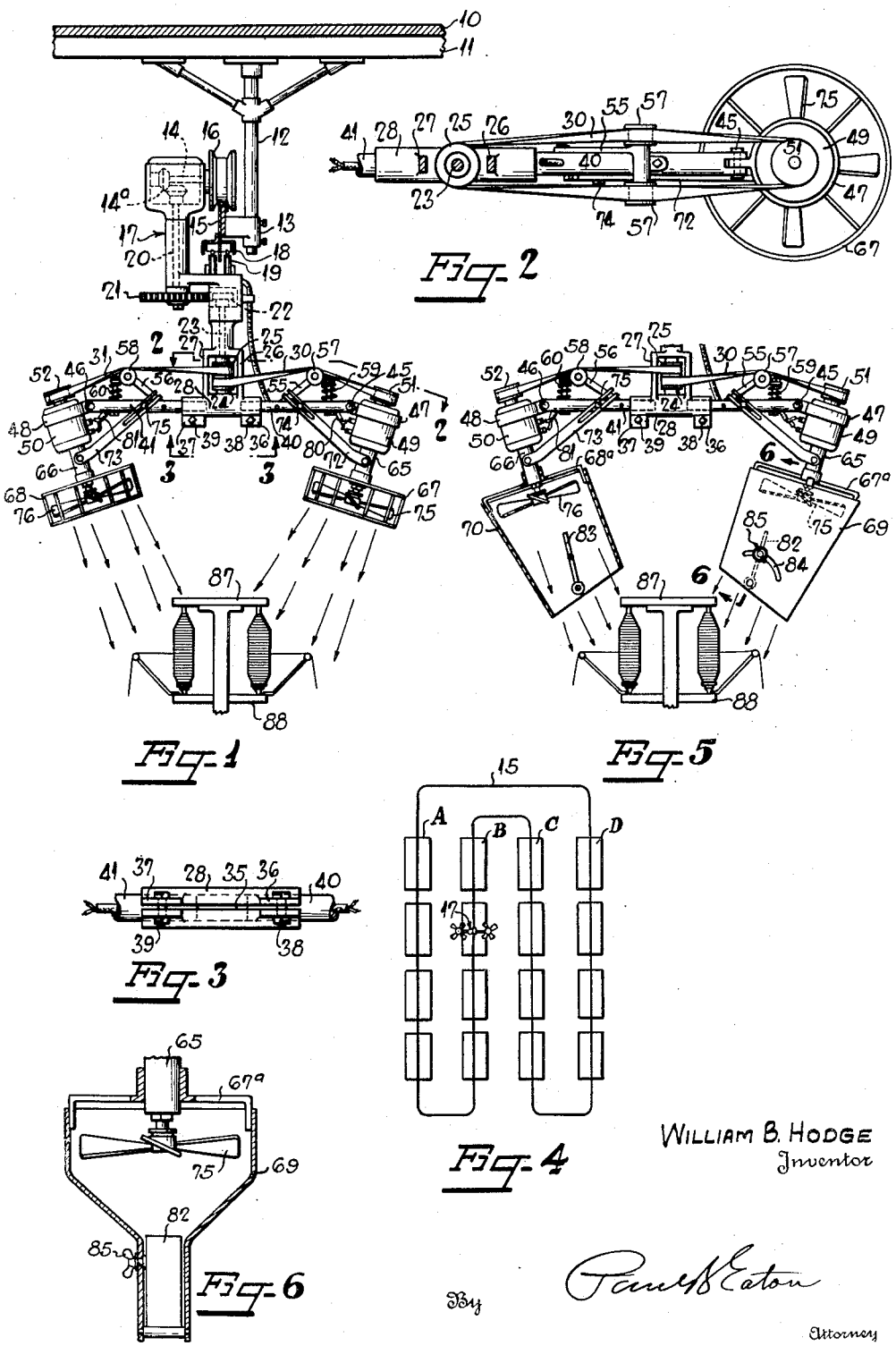
William B. Hodge
Inventor Dec. 8, 1936.  W. B. HODGE  2,063,874
TRAVELING CLEANER
Filed Jan. 17, 1936  2 Sheets-Sheet 2

WILLIAM B. HODGE
Inventor

By  Attorney

Patented Dec. 8, 1936

2,063,874

UNITED STATES PATENT OFFICE 2,063,874

TRAVELING CLEANER

William B. Hodge, Charlotte, N. C., assignor to Parks-Cramer Company, Fitchburg, Mass., a corporation of Massachusetts Application January 17, 1936, Serial No. 59,613

7 Claims. (Cl. 15—20)

This invention relates to apparatus for cleaning textile machinery by providing a trackway disposed above the machinery and having a wheeled traveler mounted for travel on said trackway with said traveler having a transversely disposed pair of arms thereon on which a pair of electric motors are adjustably mounted and each of said motors on its shaft having a fan with each of the motors not only driving its associated fan but the motors conjointly driving the traveler along the trackway.

It is an object of this invention to provide a traveler provided with a pair of fans for traveling along a trackway disposed above a machine or a plurality of machines with each of the motors driving an electric fan for producing and directing blasts of air downwardly onto the machine or machines over which the traveler passes and also for driving the traveler along the trackway.

It is another object of this invention to provide a traveler arranged to travel on a trackway disposed above one or more textile machines and having a transversely arranged portion supporting on each end thereof an electric fan driven by an electric motor with the electric motors which drive the fans having a driven connection with the wheels of the wheeled traveler for also driving it along the trackway disposed above the machine or machines.

It is a further object of this invention to provide apparatus for cleaning machinery adapted to be supported by a wheeled traveler traveling along a track over a plurality of machines or a plurality of rows of machines and said traveler having a portion extending laterally on each side of the machine and the outer end of each portion having mounted thereon an electric motor having a motor shaft with the lower end of each motor shaft having a fan thereon for producing blasts of air, the axes of the shafts of said motors being so arranged as to cause the fans to drive blasts of air downwardly onto the machines over which the traveler moves and the electric motors having a driving connection with the wheels of the traveler to also propel the traveler along the trackway and each of said electric motors being mounted for universal adjustment with relation to the traveler so that the longitudinal axes of the fans may be adjusted to the desired angle with relation to the vertical and horizontal so as to cause the drafts of air produced by the fans to impinge on the desired portions of the machinery.

Some of the objects of the invention having been stated, other objects will appear as the description proceeds when taken in connection with the accompanying drawings, in which:—

Figure 1 is an end elevation of the traveler and a portion of a spinning frame and showing the trackway and the trolley associated therewith in section;

Figure 2 is an enlarged top plan view with portions thereof in section looking downward along the line 2—2 in Figure 1;

Figure 3 is an enlarged bottom plan, detail view of the central portion of the mechanism and taken along the line 3—3 in Figure 1;

Figure 4 is a schematic arrangement showing the trackway and a plurality of rows of machines;

Figure 5 is a view similar to the lower portion of Figure 1 but showing housings disposed around the fans;

Figure 6 is a vertical sectional view taken along the line 6—6 in Figure 5 and showing the shape of the nozzle portion of the housing;

Figure 7:
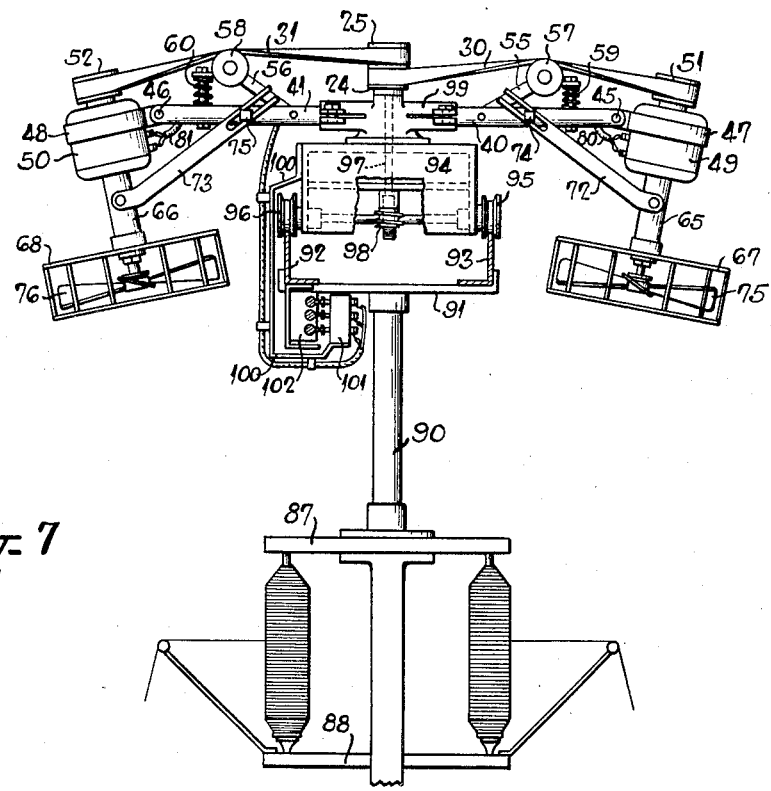
Figure 7 is a view similar to Figure 1 but showing the trackway supported by the machine over which the traveler travels.

Referring more specifically to the drawings, the numeral 10 indicates the ceiling of a building in which the textile machines are disposed and this ceiling is usually supported by joists 11. From the joists 11 there are a plurality of downwardly projecting hangers 12 each having brackets 13 thereon for supporting a single rail trackway 15 on which the wheel or wheels 16 of a wheeled traveler 17 are adapted to travel. The mono-rail trackway also supports a suitable trolley arrangement 18 with which brushes 19 are adapted to contact.

The traveler 17 has mounted therein a shaft 14 on which the wheel 16 is fixedly mounted, which, by means of a beveled gear arrangement 14a, is connected with shaft 20 disposed in the hollow portion of the traveler housing. The lower end of this shaft 20 has a pinion 21 having a driving connection with a pinion 22 on shaft 23 disposed in the hollow lower portion of the traveler housing. The shaft 23 has mounted thereon a couple of pulleys 24 and 25. The lower portions of the traveler housing is forked forming the portions 26 and 27 and having the enlarged hollow portion 28 on the lower end thereof, forming a space for the pulleys and through which the belts 30 and 31 may pass over the pulleys 24 and 25.

The traveler and trackway are similar to that shown and described in the patent to Walker, #1,781,142, issued on the 11th day of November of 1930. The member 28 is split as shown in Figure 3. By having a slot 35 and downwardly projecting ears 36 and 37 which are penetrated by bolts 38 and 39 the position of arms 40 and 41 may be adjusted by rotation.

The inner ends of arms 40 and 41 are thus seen as being capable of being adjusted by turning the same along their longitudinal axes to take care of the angularity of the axes of the motor shafts of the electric motors mounted on the outer end of these arms. These arms 40 and 41, on their outer ends, have pivotally secured thereto, as at 45 and 46, motor mounts 47 and 48 supporting electric motors 49 and 50, which motors, on their upper ends have pulleys 51 and 52 on which the belts 30 and 31 respectively, are mounted.

The arms 40 and 41 have hingedly secured thereon arms 55 and 56, having idler pulleys 57 and 58 thereon normally pressed into engagement with their respective belts by means of springs 59 and 60. It is noted in Figure 2, that the pulleys 57 and 58 are in duplicate to accommodate both portions of their respective belts. The adjustment of the arms 40 and 41 with relation to member 28, has been described, and this gives means of adjustment of the position of the electric motors 50 and their associated fans. Another means of adjustment is provided in each of the motor housings. The motors 49 and 50 have downwardly projecting portions 65 and 66 supporting fan guards 67 and 68 in Figure 1 or housings 69 and 70 as shown in Figure 5. Secured to these projections 65 and 66 are respective arms 72 and 73 which are slotted at their other ends and are adjustably mounted by means of suitable screws 74 and 75 so that the angularity of the motor shafts may be adjusted in this direction. Each of the motors 49 and 50 has motor shafts on the upper ends of which the pulleys 51 and 52 are mounted. On the lower end of each of the motor shafts, disk fans 75 and 76 are mounted.

It is thus seen that by means of the two adjustments that the positions of each of the fans, that is, the longitudinal axis of each of the fans, can be adjusted universally so as to direct the drafts of air produced by the fans onto the desired portions of the machines. If desired, these fans may be so adjusted that their inwardly and downwardly converging swirling blasts of air may be directed past each other by one of the fans being directed rearwardly a slight angle and another being directed forwardly a slight angle. These fans are connected by suitable wiring 80 and 81 to the brushes 19 for furnishing electromotive force to the motors for driving the same.

It is thus seen that I have provided a traveler running along a trackway disposed above the machinery and having a pair of electric motors thereon, each driving a fan for producing swirling blasts of air to be directed onto the machine or machines over which the traveler travels and also having means whereby the two electric motors not only drive the two fans but also drive the traveler along the trackway.

In Figure 5 a similar structure is shown in which all parts are identical to that previously described and bear like reference characters except that instead of the guards 67 and 68, the housings 69 and 70, previously referred to, are shown. Therefore, in lieu of the guards 67 and 68 the frames 67a and 68a are secured to the extensions 65 and 66 of the motor housing in which the motor shaft is adapted to have rotative movement. The housings 69 and 70 are shown as being approximately round at the top and being flattened at the bottom to provide a nozzle portion so that a relatively wide but narrow blast of air may be directed onto the machinery. This is fully shown in Figure 6. The nozzle portions of each of the housings 69 and 70 have vanes or baffle plates 82 and 83 pivotally mounted therein. In the right-hand portion of Figure 5 it is shown how each of these vanes has a projection extending through a slot 84 with a wing nut 85 thereon so that the position of the vanes or baffle plates 82 and 83 may be adjusted to properly proportion the air issuing from said nozzle to direct the proper amount of swirling blasts of air onto the desired portions of the machines over which the traveler travels.

In Figure 4, there are shown a plurality of rows of machines A, B, C and D, over which the traveler 17 is adapted to travel on the continuous trackway 15. This is merely one form in which the traveler may travel as it is evident that it does not have to travel in this specific form over the machines as it may not run over but two rows of machines in a continuous cycle or it may have back and forth movement over one or more machines or one or more rows of machines.

In Figure 7 a slightly modified form of the invention is shown in which the parts are identical and bear like reference characters except that the trackway is secured to the machines over which it extends instead of being secured to the ceiling located above the machines. In this form of the invention, as in the other forms, the upper creel board is indicated by reference character 87 and the lower creel board by reference character 88, and this shows a portion of a spinning frame, although it is evident that any type of textile or other machinery may be cleaned by the traveler and the fans associated therewith.

Instead of having the traveler on an overhead trackway, the trackway is secured to the machine and comprises a plurality of uprights 90 secured at spaced intervals along the upper portion of the textile machine. Each of the uprights 90 has a cross piece 91 to which angle trackways 92 and 93 are secured having a traveler 94 with its wheels 95 and 96 in tractive engagement with the track, with a shaft 97 having worm gear connection 98 with the wheels of the traveler, and the upper end of this shaft having thereon the pulleys 24 and 25, previously described. The hollow arms 40 and 41 are secured in a bracket 99 which is secured on the upper side of the traveler instead of being a portion of the traveler 17 as shown in Figure 1. This traveler has an arm 100 projecting downwardly therefrom and then inwardly and under the trackway and has a brush arrangement 101 thereon adapted to have contact with a trolley arrangement 102.

The traveler structure shown in Figure 7, and briefly described, is similar in all respects to the traveler structure and the trackway shown in the patent to Hodge, #2,011,763, issued on August 20, 1935, and a further detailed description of the same is not deemed necessary.

A suitable wiring connection indicated by the wires 80 and 81 in Figure 1, is employed which is preferably hidden within the housing and the arms 40 and 41 are connected to the respective electric motors 49 and 50. By this means or any other suitable wiring means, the electrical energy is carried from the brushes to the electric motors for driving the fans and propelling the traveler along the trackway.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Apparatus for cleaning textile machinery comprising a trackway disposed above the machinery, a wheeled traveler mounted for travel along said trackway, a pair of oppositely and laterally projecting arms, an electric motor adjustably mounted on the outer end of each of said arms, each of said electric motors having a motor shaft and each motor shaft having a disk fan secured thereto, a driving connection between each of said electric motors and the wheels of said traveler for propelling the traveler along the trackway.

2. Apparatus for cleaning textile machinery comprising a trackway disposed above the machinery to be cleaned, a wheeled traveler mounted for travel along the trackway, a pair of oppositely disposed and laterally projecting arms adjustably secured to said traveler, an electric motor mounted on the outer end of each of said arms, each of said electric motors having a motor shaft provided with a driving connection with the wheels of said traveler for propelling the same along the trackway, each of the said motor shafts having thereon a disk fan for creating blasts of air and means for adjusting the position of each of the said motors so that the blasts of air created by said fans may be directed onto the desired portions of the machinery and over which the traveler moves.

3. Apparatus for cleaning machinery comprising a wheeled traveler, a trackway disposed above the machinery for supporting said traveler, a pair of oppositely disposed and laterally arranged electric motors mounted on said traveler, each of said electric motors having a motor shaft, a driving connection between each of said motor shafts and the wheels of said traveler for propelling the traveler along the trackway, a fan mounted on each of said motor shafts for creating air blasts and means for adjusting the position of each of said motors with relation to the machinery so as to direct the air blasts from the fans onto the desired portions of the machinery over which the traveler moves.

4. Apparatus for cleaning machines comprising a wheeled traveler adapted to move above a plurality of machines, a pair of oppositely arranged and laterally disposed motors mounted on said traveler, a fan driven by each of the motors, a driving connection between the motors and the wheels of said traveler, and means for adjusting the angular relation of said motors with relation to the traveler so as to direct the blasts of air created by said fans onto the desired portions of the machinery over which the traveler moves.

5. Apparatus for cleaning textile machinery comprising a trackway disposed above the machinery, a wheeled traveler mounted for movement on said trackway, a pair of oppositely disposed and laterally protruding arms mounted on said traveler, an electric motor mounted on the outer end of each of said arms, means for adjusting the position of said motors universally with relation to said traveler, a fan mounted on and driven by each of the electric motors and a driving connection between each of the electric motors and the wheels of said traveler.

6. Apparatus for cleaning textile machinery comprising a trackway disposed above the machinery, a wheeled traveler mounted for travel along said trackway, a vertically disposed shaft, a pair of electric motors oppositely and laterally arranged with relation to said shaft and each having a fan thereon, a driving connection between each of said motors and said shaft, a driving connection between said vertically disposed shaft and the wheels of said traveler, means for universally adjusting the position of said motors with relation to said traveler so as to direct the air currents created by said fans onto the desired portion of the machinery.

7. Apparatus for cleaning machines comprising a wheeled traveler adapted to move above a plurality of machines, a pair of oppositely and laterally disposed motors mounted on said traveler, a fan mounted on and driven by each of the motors, a driving connection between the motors and the wheels of said traveler, means for adjusting the angular relation of said motors with relation to the traveler so as to direct the blasts of air created by said fans onto the desired portions of the machinery over which the traveler moves, and a housing surrounding each fan and having a nozzle on its lower end which is wide transversely of the machine and narrow longitudinally of the machine, and a baffle plate adjustably mounted in each nozzle for dividing and proportioning the air blasts issuing from the housing.

WILLIAM B. HODGE.